United States Patent [19]
Lerner

[11] Patent Number: 5,017,348
[45] Date of Patent: May 21, 1991

[54] TREATMENT OF NITROGEN OXIDES

[75] Inventor: Bernard J. Lerner, Pittsburgh, Pa.

[73] Assignee: Beco Engineering Company, Glenshaw, Pa.

[21] Appl. No.: 301,851

[22] Filed: Jan. 26, 1989

[51] Int. Cl.$^5$ .................. C01B 21/00; C01B 21/40
[52] U.S. Cl. .................. 423/235; 423/393; 423/394
[58] Field of Search .................. 423/393, 235, 394

[56] References Cited

U.S. PATENT DOCUMENTS

| | | | |
|---|---|---|---|
| 1,338,417 | 4/1920 | Bergue et al. | 423/393 |
| 2,028,402 | 1/1936 | Luscher | 423/393 |
| 2,543,446 | 2/1951 | Egly | 423/393 |
| 2,566,197 | 8/1951 | Hass et al. | 423/393 |
| 3,472,620 | 10/1969 | Riga | 423/393 |
| 4,081,518 | 3/1978 | Selin et al. | 423/393 |
| 4,372,935 | 2/1983 | Botton et al. | 423/393 |
| 4,419,333 | 12/1983 | Reus et al. | 423/393 |
| 4,562,052 | 12/1985 | Grab et al. | 423/393 |

FOREIGN PATENT DOCUMENTS

| | | | |
|---|---|---|---|
| 768205 | 12/1971 | Belgium | 423/393 |
| 18451 | 12/1962 | Japan | 423/393 |
| 118175 | 6/1958 | U.S.S.R. | 423/393 |

Primary Examiner—Wayne A. Langel
Attorney, Agent, or Firm—Hymen Diamond

[57] ABSTRACT

The mixture of aqueous nitric and nitrous acids which is produced by the absorption of nitrogen oxides with water in the manufacture of nitric acid is conducted to a closed vessel, where the acid mixture is reacted with oxygen, preferably under pressure, and is then returned to the absorber. This treatment has been found to enhance the absorption of the nitric oxide (NO) component of the gas mixture of NO and $NO_2$ which is supplied to the absorber in the production of nitric acid. Normally, nitric oxide has a low solubility in the mixture of nitric and nitrous acids. Because nitric oxide oxidation is the controlling factor in the operation of nitric acid plants, this enhanced absorption provides for more efficient and economic nitric acid manufacture, as well as for the reduction of emissions of nitrogen oxides in the acid plant tail gases.

The same invention is also applicable to the removal of nitrogen oxides from emissions generated in processes other than nitric acid manufacture.

14 Claims, 2 Drawing Sheets

TREATMENT OF NITROGEN OXIDES

Background of the Invention

This invention relates to processes in which nitrogen oxides are reacted or in which these oxides are undesirably emitted to the atmosphere. This invention has particular relationship to chemical reactions involving the absorption of $NO_x$ in arriving at the final product of a process and/or in the removal of $NO_x$ from process emissions.

An important adaptation of this invention is in the manufacture of nitric acid. This adaptation will be emphasized in this application in the interest of relating this invention to a specific industrial process so as to facilitate the understanding of this invention and its ramifications. It is to be understood that any adaptation of the principles of this invention to any other process is within the scope of equivalents thereof under the Doctrine of Equivalents as the Doctrine is interpreted in Uniroyal, Inc. v. Rudkin-Wiley Corp. 5USPQ 2d 1434 (C A FC1988) (at 1441).

In the conventional manufacture of nitric acid, nitrogen oxides derived from the oxidation of ammonia are absorbed in water to form the nitric acid. The principal nitrogen oxides that are involved in the absorption step are nitric oxide, NO, nitrogen dioxide, $NO_2$, and the dimer of $NO_2$, $N_2O_4$. These oxides are herein referred to as $NO_x$ and are the oxides which are of significance to this invention.

The absorption of nitrogen oxides into water or aqueous nitric acid solutions is the process stage that requires the largest share of the total equipment volume and capital costs. $NO_2$ is itself relatively water-insoluble, but gas-phase $NO_2$ is in equilibrium with the dimer form, $N_2O_4$, which is soluble. On the other hand, NO is relatively insoluble. To dissolve the NO, the practice in accordance with the teachings of the prior art is to oxidize the NO to $NO_2$ in the gas phase by means of the residual oxygen in the process gas. Because the oxidation of NO in the gas phase is a kinetically slow reaction, and also because there is only 1 to 5% residual oxygen in the process gas, large amounts of absorber gas volume are required in prior art practice to provide the necessary gas-phase residence time. A nitric acid absorption train typically contains two or more absorption towers. As the $NO_x$ concentrations decrease through an absorber train, the decrease in gas-phase concentrations of NO and $NO_2$ slows the reactions down to the point where it becomes more economical to discharge the residual $NO_x$ gases than to provide the extra absorber volume for conversion of the residual NO. The discharge of $NO_x$ creates an environmental problem.

The chemistry of $NO_x$ absorption in aqueous solutions in the manufacture of nitric acid is believed to take place by means of the following overall reactions:

$$2NO_2(g) \rightleftharpoons N_2O_4(g) \tag{1}$$

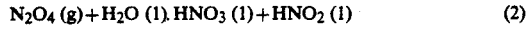

$$N_2O_4(g) + H_2O(l) \rightarrow HNO_3(l) + HNO_2(l) \tag{2}$$

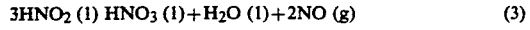

$$3HNO_2(l) \rightleftharpoons HNO_3(l) + H_2O(l) + 2NO(g) \tag{3}$$

$$2NO(g) + O_2(g) = 2NO_2(g) \tag{4}$$

Reaction (1) referred to above represents the gas phase dimerization of $NO_2$ to form equilibrium amounts of the water-soluble tetroxide compound. As the $N_2O_4$ dissolves and reacts with the water, Reaction (1) proceeds to the right. The absorption reaction, Reaction (2), results in the equimolar formation of nitric acid and nitrous acid in the liquid phase. Reaction (3) is the equilibrium disproportionation reaction of $HNO_2$ in the liquid phase which generates NO. The so-generated NO rapidly desorbs to the gas phase because of its very limited liquid solubility. Reaction (3) represents both the disproportionation reaction of $HNO_2$ and the desorption of NO to the gas phase.

Increases in $HNO_2$ concentration in the liquid phase, which is a concommitant of progression of Reaction (2) to the right, will displace Reaction (3) to the right, generating additional NO. Reaction (4) represents the gas-phase oxidation of NO, which is believed to be the slow and controlling step in the overall set of the simplified absorption reactions, (1) through (4). Reactions (3) and (4) are not only the limiting reactions with respect to absorption rates and equipment size, they also are the stoichoimetric cause of incomplete $NO_2$ absorption and the persistence of $NO_x$ in nitric acid plant tail gases.

In other processes involving uses and reactions of nitric acid, typical examples of which are organic nitrations, hydrometallurgical processes, precious metal refining and recovery and the like, the same reactions prevent the complete removal of $NO_x$ from the off-gases by absorption processes. Emission of nitrogen oxides from such processes, as well as that of the $NO_x$ in nitric acid plant tail gases, is a serious atmospheric pollution problem, particularly because the nitrogen oxides contribute materially to smog and acid rain.

Catalytic reduction processes for $NO_x$ emission control have been used in accordance with the teachings of the prior art in the majority of nitric acid plants seeking to comply with $NO_x$ emission standards. Such processes typically use ammonia as the reducing gas and precious metal or other catalysts, as described in Welty, U.S. Pat. No. 4,164,546, and others. The wasteful consumption of ammonia and the elevated temperature requirements make catalytic reduction economically unattractive, and it is employed only in the absence of feasible alternatives.

Reaction (3) indicates that the formation and desorption of NO may be suppressed by the removal of $HNO_2$ from its liquid phase solution in $HNO_3$. Nitrous acid, $HNO_2$, can be oxidized in accordance with the liquid-phase reaction:

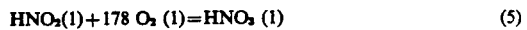

$$HNO_2(l) + 1/2 O_2(l) = HNO_3(l) \tag{5}$$

Botton and Cosserat, in U.S. Pat. No. 4,372,935, attribute the problem of slow rates of $NO_x$ absorption to the inadequacy of Reaction (5) in the dilute gas concentration range of a nitric acid absorption train, and teach the use of extended gas-liquid contact time in the third absorber column of the plant train. Their data show that by increasing the overflow weir height on the last 20 trays of the third $NO_x$ absorber, the tail-gas $NO_x$ emission can be decreased. Doubling the overflow weir height reduces the tail-gas $NO_x$ concentration from 968 to 635 ppmv (parts per million by volume) and increasing the weir height 4.4 times, decreases the $NO_x$ to 376 ppmv. Essentially, the Botton teaching is to achieve increased mass transfer and liquid dwell time by increasing the overflow weir height. But, notwithstanding the substantial increased cost and complexity which is involved, the method is ineffective.

Herbrechtsmeier, Steiner and Vilczek, U.S. Pat. No. 4,309,396, teach the partial reduction of $NO_x$ emissions, for example, from 3,300 ppmv to 2,000 ppmv, by large increases in total gas pressure and liquid/gas ratio in an $NO_x$ absorber of a nitric acid plant. The reduction is not sufficient to meet the standards for $NO_x$ emission reduction imposed by most environmental laws, which require an exhaust concentration of approximately 200 ppmv.

Janiczek, in Polish No. 61061, teaches the treatment of acid taken from a nitric acid plant absorber train with oxygen in a countercurrent flow contactor. Reus, Wewer and Jungen, U.S. Pat. No. 4,419,333, teach the use of air to oxidize NO absorbed in 15–50 weight % $HNO_3$. It is conjectured that to obtain dissolved oxygen for Reaction (5), it is necessary to transfer oxygen to the liquid phase:

$$\tfrac{1}{2} O_2 (g) = \tfrac{1}{2} O_2 (l) \qquad (6)$$

Both Janiczek and Reus employ "open-ended" systems for liquid-gas contacting, in which the gas flows continuously through the contactor and therefore serves as an acceptor and infinite sink for gases stripped from the liquid. This apparatus has not been effective.

Fauser, in Chemical and Metallurgical Engineering, Vol. 39, pp. 430–432, August, 1932, describes a method for directly manufacturing 98% $HNO_3$ in which a mixture of dilute $HNO_3$ and $N_2O_4$ is fed to an autoclave, the temperature is raised to 70° C., and then oxygen at a pressure of 50 atmospheres is introduced. Even under these extreme conditions, four hours were required to complete the reaction. Because of the batch nature of the operation, and the long time for reaction completion, this process is not suitable for continuous $NO_x$ production, i.e., continuous oxidation and absorption and removal of product.

It is an object of this invention to overcome the disadvantages and drawbacks of the prior art, and to provide a method for continuous production of nitric acid which shall be more efficient than prior art methods. It is another object of this invention to provide a method for the enhanced absorption of $NO_x$ from nitric acid plant tail gases and other industrial $NO_x$ emission sources. Another object of this invention is to provide apparatus for practicing this method. More generally stated, it is an object of this invention to provide a new method and apparatus for the enhanced absorption of nitrogen oxides and particularly, nitric oxide, in industrial processes in a practical manner at comparatively low cost, and to control emissions of nitrogen oxides from such processes.

SUMMARY OF THE INVENTION

It has been realized in arriving at this invention based on the study of the prior art that the key, both to improving the efficiency of the production of nitric acid and the reduction of $NO_x$ in the emissions resulting from the production of nitric acid, resides in the effective absorption of NO in the process. This also applies to other processes generating $NO_x$, wherein aqueous absorption of the emission is practiced. The practices of the prior art for increasing the efficiency of $NO_x$ absorption in operations such as the production of nitric acid, or absorption of the $NO_x$ from process emissions, including nitric acid plant tailgases, have proven ineffective, excessively costly, or difficult to practice. Botton is ineffective because, even assuming that effective transfer would take place in terms of augmented oxygen transfer to the liquid, there is normally only about 1 to 5% oxygen in the process gas in nitric acid plant absorption towers, so that the Botton approach is self-limiting with respect to liquid-phase oxygenation. Herbrechtsmeier is similar to Botton. The very low concentration of oxygen present in nitric acid plant absorber gases prevents significant oxygen transfer to the liquid via a total pressure increase in the absorber. Because removal of a relatively insoluble gas (NO) from an unstable liquid component ($HNO_2$) occurs much more readily than the attempted simultaneous dissolution of highly insoluble gas component ($O_2$) the contactors of Janizcek and Reus et al, serve as strippers rather than absorbers. Per Reaction (3), liquid aeration or oxygenation of a liquid containing $HNO_2$ in any apparatus that provides open-ended capacity for the reception of stripped off-gas from the liquid will be self-defeating With respect to oxidation in the liquid phase of either NO or its precursor, $HNO_2$. Any attempt to aerate or oxygenate liquid in an open system would tend to strip off the dissolved NO at the same time the transfer of oxygen is being attempted. As is indicated by Reaction (3), removal of NO from the $HNO_3$ solution will push Reaction (3) to the right, generating additional amounts of NO. Therefore, open-system aeration or oxygenation results in NO evolution from the liquid, rather than its retention and liquid-phase oxidation.

The Reus et al teaching does not appear to differ significantly from conventional air bleaching in nitric acid plants of the strong $HNO_3$ product acid (50–60 weight %) other than in the concentration of $HNO_3$ employed. Further, the Reus et al "purified gas mixture" contains NO plus $NO_2$ and must be further scrubbed with a hydrogen peroxide solution for $NO_x$ removal. Similarly, Janiczek's oxygen "aeration" method provides for enhanced acid bleaching; it causes NO removal from the liquid by stripping, rather than its liquid-phase oxidation.

In arriving at this invention, it was realized that oxidation of $HNO_2$ in solution by aeration or similar techniques in an open system is self-defeating because it shifts the NO-forming reaction, Reaction (3), to the right, thus stripping, or blowing off, NO from the liquid. An "open" system is defined as one in which gas is continuously passed through or over the liquid under conditions where the vapor pressure of NO from an equilibrium $HNO_3/HNO_2$ liquid solution is greater than its partial pressure in the gas.

The singular and consistent deficiency of the prior art discussed above is the failure to recognize that treating $HNO_2$ in solution with air or oxygen in an open system will remove from solution the very reactants, $HNO_2$ and NO, that require liquid-phase oxidation. This causes continuous, open-ended removal of NO from the solution, whether air or pure oxygen is used. Because the objective of the absorption operation is to remove $NO_x$ from the gas and to convert $NO_x$ to $HNO_3$, any supplementary operation that Puts $NO_x$ back into the gas phase is contravening. The NO displaced from the solution by the stripping action must then be re-oxidized to $NO_2$ prior to re-absorption by means of a slow termolecular reaction.

In accordance with this invention, a method of producing nitric acid is provided in whose practice and use the liquid from an absorber, in which an $NO_x$-containing gas is treated with water or nitric acid to generate, or increase the concentration of, nitric acid, is removed from the absorber and is contacted with oxygen in a closed oxygenation vessel or oxygenator, and is then recycled to the absorber. Liquid taken from the absorber consists of $HNO_3$ and $HNO_2$. The oxygenation vessel contains substantially pure oxygen, preferably 95 to 100% pure oxygen. While the substantially pure oxygen concentrations have proven uniquely effective in the practice of this invention, lower concentrations of $O_2$ may be used in accordance with the broader aspects of this invention. The nitric acid/nitrous acid solution taken from the absorber is continuously and repeatedly recycled between this oxygenation vessel and the absorber. It has been discovered that, in the process of passing through the oxygenator vessel, the treated solution's capacity for NO dissolution in the absorber is remarkably enhanced. Specifically, it has been discovered in the actual practice of this invention that when liquid from an absorber in an $NO_x$ absorption process is treated with oxygen in a closed vessel, and is then returned to the absorber, the absorption of NO, which is normally substantially insoluble, becomes far higher than the absorption of the substantially soluble $NO_2$, as $N_2O_4$. This phenomenon is particularly striking when the respective partial pressure driving forces for the NO and $NO_2$ are taken into consideration. The cause of this phenomenon is uncertain. It may be due to the return to the absorber from the oxygenator of liquid containing lower concentrations of liquid-phase $HNO_2$ or NO, or enrichment of the liquid returned to the absorber in oxygen concentration, or some combination of mechanisms not yet clearly understood.

The expression, "closed-vessel", as used in this application means a vessel which is closed as far as emission or leakage therefrom is concerned; i.e., is gas-tight. The "closed oxygenation vessel" of this invention admits oxygen supplied under a positive pressure differential, and the liquid from the absorber, also supplied to the oxygenator vessel under a positive pressure differential, and transmits that liquid which it processes. The pressure of oxygen in the oxygenation vessel is maintained substantially constant and the oxygen is continuously replenished as it is used in the reaction with the $HNO_2$ in the liquid flowing into the oxygenator and in saturating the liquid. Because no gas is withdrawn, the overall apparatus is closed or dead-ended with respect to gas flow, and open-ended with respect to liquid flow.

Contact with the oxygen in the vessel may be obtained by any conventional means, such as countercurrent tray or packed bed contacting, recycle sparging of the gas phase through the liquid by means of a gas compressor, or by spraying of the liquid through the stagnant gaseous oxygen in a fine spray. The bottom of the oxygenation vessel may be used as a liquid reservoir, or an external tank may be provided for this purpose. In any case, depending on the chemical oxygen demand (COD) of the solution and the efficiency of liquid-gas contacting, it may be advantageous to recycle the liquid through the oxygenator to ensure adequate transfer of oxygen to the liquid.

It is desirable to operate the dead-end oxygenation vessel with oxygen containing a minimum amount of inert gas. If air were to be utilized in the dead-end oxygenation vessel, both nitrogen and oxygen would dissolve. The dissolved oxygen, representing 21% by volume of the total dissolved gas, would react to satisfy the COD of the liquid, and this dissolved oxygen would then be replaced by incremental air dissolution, substantially comprising 79% nitrogen and only 21% oxygen. This replacement of dissolved and reacted oxygen by nitrogen would eventually give rise to a solution equilibrium back-pressure of nitrogen equal to the total pressure of the air phase, at which point all gas dissolution would cease, and no incremental oxygen would be transferred to the liquid. It is therefore advantageous to provide for a periodic inert-gas bleed or purge, even when oxygen of fairly high purity is used in the oxygenation vessel.

Because oxygen is commercially available in high-pressure cylinders (2000–2500 psig) an oxygen cylinder may be directly connected to the oxygenation vessel, and the pressure in the vessel may then be advantageously adjusted to regulate the amount or rate of oxygen transfer to the liquid to any required level. Because of the ready availability of very high pressure oxygen sources, the oxygenation process of this invention may thus be used in conjunction with high-pressure $HNO_3$ absorption equipment, as well as in the atmospheric absorption of $NO_x$.

The use of commercial grades of oxygen in the dead-ended oxidation process has several distinct and unique advantages in the practice of this invention. Commercial-grade oxygen is substantially pure and the use of this oxygen eliminates any significant inert-gas contribution to gas-side mass transfer resistance, so that oxygen absorption is facilitated. Second, the partial pressure of oxygen in the gas is substantially equal to the total pressure, which increases both the mass transfer rate and level of oxygen solubility to the maximum degree practicable. Additionally, any NO released from solution-borne $HNO_2$ by Reaction (3) is released to a closed fixed volume so that equilibrium NO partial pressure in the gas is rapidly reached. There is then no further outlet for NO (no additional gas-holding capacity) and, therefore, no further liquid-phase $HNO_2$ decomposition as the pregnant liquid passes through the vessel. Further, any NO initially released to the gas phase according to $HNO_2$ decomposition by Reaction (3) is released into a gas phase comprising substantially pure oxygen. As a result, any gas-phase NO is oxidized to $NO_2$ at the maximum possible rate and is re-absorbed in the oxygenator as $NO_2$ to form $HNO_3$ and $HNO_2$ as per Reactions (1) and (2). Therefore, at steady-state liquid flow conditions, only extremely low levels of $NO_x$ are in the dead-ended gas phase, and these concentrations are the equilibrium dead-end values. This invention thus solves the problem of controlled oxygen transfer to the $HNO_2$ solution without displacement of the Reaction (3) equilibrium to the right, which strips NO from the liquid.

Equilibrium solutions of $HNO_2$ in $HNO_3$ as described by Reaction (3) are encountered in the usual absorption operation of nitric acid manufacture. The process of this invention may be applied to a $HNO_3$ solution containing $HNO_2$, by withdrawing such a solution from the absorber, oxidizing it in the closed-end oxygenation vessel of this invention, and then returning the processed solution to the absorber. The process and apparatus of this invention may also be applied to treatment of nitric acid plant tail-gases after emission from a nitric acid process, or to any industrial $NO_x$ emission, by providing both an absorber and the closed-end oxygenation vessel of this invention as a separate unit.

While the theoretical mechanisms and conjectural chemical reactions set forth in explanation are logical and provide for a partial understanding of the nature of this invention, they do not fully account for the unexpected NO absorption benefit resulting from the practice of this invention. It is not intended that the description here of the theoretical mechanisms or conjectural chemical reactions should in any way affect or restrict this application or any patent which may issue on or as a result thereof

Brief Description of the Drawing

For a better understanding of this invention, both as to its organization and as to its method of operation, together with additional objects and advantages thereof, reference is made to the following description, taken in connection with the accompanying drawings, in which.

DETAILED DESCRIPTION OF PRACTICE

Figure 1:
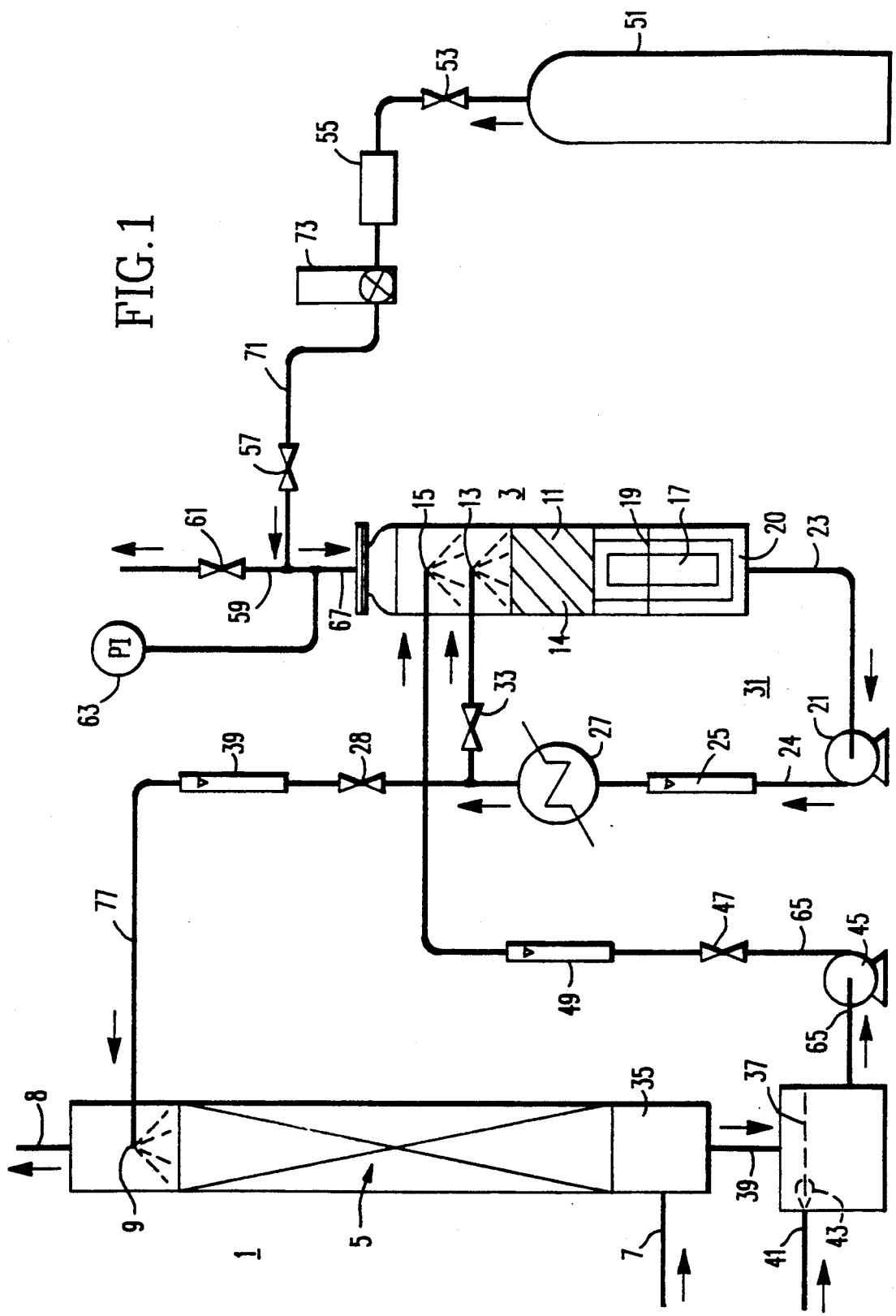
FIG. 1 is a diagrammatic view of apparatus for practicing the method of this invention and in whose practice the phenomenon at the root of this invention demonstrably takes place.

FIG. 1 includes an absorber 1 and a gas-tight oxygenator 3. The absorber 1 is provided with packing 5. The absorber 1 includes an inlet pipe 7 through which it is supplied with a mixture of $NO_x$, typically derived from the oxidation of ammonia with air. The top of the absorber 1 includes a spray 9 for delivering a liquid to the packing 5 countercurrent to the flow of $NO_x$ and air delivered through conductor 7. The $NO_x$ is absorbed in the liquid flowing over the packing 5. The absorber 1 includes an outlet 8 for venting $NO_x$. In the practice of the invention, the absorption of NO is enhanced, and the emission of NO and $NO_2$ is minimized.

The oxygenator includes packing 11. There is a spray 13 for recycled liquid and a spray 15 for introducing liquid from the absorber 1 near the upper end of the oxygenator. The oxygenator is provided with a sight-glass 17 through which the level 19 of the liquid in the reservoir 20 may be observed.

A pump 21 drives the liquid derived by conductor 23 from the oxygenator 3 to the spray 9 through a conductor 24, a rotameter 25, a heat exchanger 27, a valve 28, and a rotameter 29. The pump 21 also drives the liquid from the oxygenator 3 through a recycle circuit 31 including conductor 24, rotameter 25, heat exchanger 27 and a valve 33 to recycle spray 13. The reacted liquid in absorber 1 is deposited in a sump 35 whence it flows into a tank 37 through conductor 39. The tank 37 is suppled with make-up water through conductor 41 under level control by a float valve 43 which controls the level of the liquid. A pump 45 drives the liquid from tank 37 to spray 15 through the valve 47 and the rotameter 49. Substantially pure oxygen is supplied to the oxygenator 3 from a commercial vessel 51 through a valve 53, a regulator 55 and another valve 57. A vent 59 for startup is controlled by a valve 61. The pressure in the oxygenator 3 is measured by a gage 63.

In the practice of this invention, the solution of $HNO_3$ and $HNO_2$ from the absorber 1 is driven by pump 45 into oxygenator 3 through valve 47, rotameter 49 and spray 15. It is conjectured that the $HNO_2$ from the absorber is reacted with oxygen, producing $HNO_3$, suppressing the formation of NO in accordance with reaction (3). The resulting liquid, enriched in $HNO_3$, and in oxygen, is recycled to the absorber by pump 21 through conductor 24, rotameter 25, heat exchanger 27, rotameter 29 and spray 9. This liquid is also recycled for further reaction through conductor 24, rotameter 25, heat exchanger 27, valve 33 and spray 13. It has been discovered that the oxygen-treated liquid returned to the absorber has the unexpected capability of absorbing NO at a faster rate than $NO_2$. An actual instance of the practice of this invention with the apparatus shown in FIG. 1, demonstrating the occurrence of this phenomenon, will now be described.

EXAMPLE

A 4-inch diameter countercurrent gas-liquid absorber, packed to a depth of 4 feet with ½-inch stainless steel Raschig rings 5, was used to absorb the $NO_x$. The air stream containing the $NO_x$ was fed at a slight positive pressure to the bottom of the absorber through pipe 7 at a rate of about 12 CFM. The exit gas left the absorber 1 through outlet 8. The gas flowed upwardly through the packing 5 in countercurrent contact with a treated dilute recycle nitric-nitrous acid stream taken from the oxygenation vessel sump liquid reservoir and fed to the top of the absorber 1 at a rate of 0.8 GPM through a spray nozzle 9. Exit liquid was collected at the bottom of the absorber in a 10-gallon tank 37 equipped with a float valve level control 43 for providing make-up water. Liquid from the tank 37 was fed by means of a gear pump 45 through a ½-inch tubing line 65 to a spray nozzle 15 in the closed oxygenation vessel 3. Line 65 contained the control valve 47 and the feed rotameter 49.

The oxygenation vessel 3, contained a 12-inch deep bed 11 of metal Pall rings and was charged with a commercial oxygen cylinder 51 to a pressure of 50 psig. Vessel pressure was read on a pressure gage 63 on a ½-inch pipe line 67 connected to the top of the oxygenator 3. This line 67 served both for the admission of oxygen and for the periodic exhaust of any inert gases, admitted with the oxygen, from the oxygenation vessel through purge valve 61.

The oxygenation vessel pressure was automatically controlled by means of a pressure regulator 55 on the oxygen cylinder 51 connected to a conductor 71 containing a flow meter 73 and a valve 57. With valve 57 closed and valve 61 open, inert gases were vented from the oxygenator, and with valve 57 open and valve 61 closed, oxygen was supplied to the oxygenator 3.

Oxygen-treated liquid was collected in the oxygenation vessel reservoir 20 and was conducted by a 1-inch pipe line 23 to the suction side of the recycle pump 21. The liquid discharged by the recycle pump 21 was pumped through ½" pipe line 24 through recycle rotameter 25 and through heat exchanger 27 where the recycle liquid was cooled by means of heat exchange with cooling water. From the heat exchanger 27 a portion of the recycle liquid was recycled to the oxygenation vessel spray nozzle 13 at a rate controlled by valve 33. A second portion of the recycle liquid was recycled to the top of the absorber 1 through control valve 28, absorber feed rotameter 29 and line 77 and spray nozzle 9. The rate of liquid recycled to the absorber 1 from the oxygenator vessel 3 was maintained at the same rate that the absorber feed pump 45 withdrew liquid from the absorber holding tank 37. This was accomplished by adusting control valves 47 and 28 until the readings on the identical rotameters 49 and 29 were the same. The ratio of the total liquid rate supplied to the oxygenation vessel 3 to the liquid rate fed to the absorber is defined as the recycle ratio.

Four experimental runs were carried out with the apparatus, following the method disclosed above. For each run the gas entering the absorber 1 at the inlet 7 and the gas leaving the absorber at outlet 8 were periodically analyzed for $NO_x$ and $NO_2$, and the NO concentration was taken as the difference between the measured total $NO_x$ concentration and the measured $NO_2$ concentration.

Table I presents the measurements taken every half-hour (listed in the left-hand column) in parts per million by volume (ppmv) inlet concentrations at inlet 7 and outlet concentrations at outlet 8. The respective inlet and outlet concentrations of $NO_2$ are shown in Columns 2 and 3, and the respective inlet and outlet concentrations of NO are shown in Columns 5 and 6. The corresponding percentages of removal by the absorber 1 and oxygenator 3 system of this invention are shown in Columns 4 and 7 for $NO_2$ and NO, respectively. Table I shows that for Run 1, the percentage of NO removal was substantially higher than that for $NO_2$.

In Table II, the average inlet $NO_x$ concentrations in ppmv at inlet 7 and the average outlet $NO_x$ ppm concentration at outlet 8 for each of the four runs are presented in Columns 2 and 3. Corresponding average percentage removals of NO and $NO_2$ are presented in Columns 4 and 5. The average concentration of $HNO_3$ in the liquid is given in Column 6 and the recycle ratio is stated in Column 7. Table II shows that, except for Runs 2 and 4, in which the percentage removals of NO and $NO_2$ were substantially the same order of magnitude, the percent removal of NO was higher than the percent removal of $NO_2$. But Runs 2 and 4 are actually consistent with Runs 1 and 3 if the driving force is considered. This is shown in Table III. Because NO is normally relatively insoluble as compared to $NO_2$ (as $N_2O_4$) the results tabulated in Tables I and II show the complete reversal of the expected absorption behavior of $NO_2$ and NO.

TABLE I

| Run 1 Time | Inlet $NO_2$ PPM | Outlet $NO_2$ PPM | % $NO_2$ Removal | Inlet NO PPM | Outlet NO PPM | % NO Removal |
|---|---|---|---|---|---|---|
| 8:30 A | 1000 | 530 | 55.3 | 900 | 320 | 64.4 |
| 9:00 | 1350 | 830 | 46.8 | 1000 | 420 | 58.0 |
| 9:30 | 1300 | 720 | 50.0 | 900 | 380 | 57.8 |
| 10:00 | 1450 | 950 | 42.6 | 900 | 400 | 55.6 |
| 10:30 | 1400 | 880 | 43.5 | 900 | 420 | 53.3 |
| 11:00 | 1360 | 900 | 40.9 | 840 | 400 | 55.0 |
| 11:30 | 1260 | 800 | 47.6 | 840 | 300 | 64.3 |
| 12:00 N | 1360 | 800 | 48.9 | 940 | 400 | 57.4 |
| 12:30 P | 1530 | 940 | 44.9 | 920 | 410 | 55.4 |
| AVGES | 1334 | 817 | 46.7 | 904 | 383 | 57.6 |
| 1:00 P | —* | —* | —* | —* | —* | —* |
| 1:30 | 1700 | 1070 | 37.1 | 1100 | 680 | 38.2 |
| 2:00 | 170 | 1270 | 25.3 | 1100 | 680 | 38.2 |
| 2:30 | 1800 | 1190 | 33.9 | 1100 | 710 | 35.4 |
| AVGES | 1733 | 1177 | 32.1 | 1100 | 690 | 37.3 |

| | |
|---|---|
| Gas Flow at Inlet 7 | 12 cfm |
| Flow of $HNO_3$ and $HNO_2$ through Absorber 1 and Oxygenator 3 | 0.8 GPM |
| Recycle Flow around Oxygenator 3 | 4.5 GPM |
| At 1:00 P.M., 4 gallons of 60% $HNO_3$ charged to tank 37 | |
| Concentration of $HNO_3$ in Tank 37 and Reservouir 20 during AM run | 11.75 wt. % |
| Concentration of $HNO_3$ in Tank 37 and Reservoir 20 1:00–2:30 P.M. | 32.1% wt. % |

TABLE II

| | Average Removals | | | | | |
|---|---|---|---|---|---|---|
| Run No. | Avg. $NO_x$ In. PPM | Avg. $NO_x$ Out. PPM | % $NO_2$ Removal | % NO Removal | $HNO_3$ Concn. % | Recycle Ratio |
| Run 1 AM | 2238 | 1200 | 46.7 | 57.6 | 11.75 | 5.63 |
| Run 1 PM | 2833 | 1867 | 32.1 | 37.3 | 31.2 | 5.63 |
| Run 2 | 2000 | 1320 | 35.9 | 30.3 | 21.8 | 3.0 |
| Run 3 | 4417 | 1925 | 53.5 | 74.7 | 3.4 | 6.0 |
| Run 4 | 3090 | 1280 | 58.9 | 55.2 | 18.2 | 6.0 |

Even if NO was equally as soluble as $NO_2$ (as $N_2O_4$) handicapping it with half the gas-phase concentrations of the $NO_2$ would lead to the expectation of much lower NO removals than $NO_2$ removals. The reverse is true, and it is clear that the oxygen vessel treatment of the liquid causes the NO to be absorbed more rapidly than the $NO_2$ in the absorber.

For the Run 1 data presented in Table I, the concentration of nitric acid circulating in the absorber and oxygenator system was initially 11.75%, and was then changed to approximately 31.2% at 1:00 P.M. by the addition of 4 gallons of 60% nitric acid to the 10-gallon absorber reservoir tank 37. Despite this tripling of acid concentration, which reduced both NO and $NO_2$ removal, the percent NO removal still remained higher than the percent $NO_2$ removal.

Further examination of the experimental data of Tables I and II show that the absorption of $NO_x$ was maximum in the most dilute $HNO_3$ solutions, with the maximum degree of both NO and $NO_2$ removal occurring at 3.4% $HNO_3$ concentration, which was the most dilute acid concentration used. However, at all acid concentrations used, including the most concentrated $HNO_3$ acid solutions, remarkably-enhanced absorption of NO relative to $NO_2$ was evidenced. The data show that the method and apparatus of this invention are effective over the range of 3.5% to 31% nitric acid, which covers a major part of the usual range of nitric acid concentrations encountered in nitric acid plant absorbers.

The behavior of the NO described above is even more striking when its relative driving force for absorption is considered. The true driving force for absorption of a gas component is the difference in its fugacity in the gas phase and its fugacity in the liquid phase. For the relatively dilute gas-phase concentrations and atmospheric pressure conditions in the absorber 1 of the runs of Table II, the fugacities of NO and $NO_2$ may be taken as substantially equal to their respective partial pressures in the gas. The average driving force for absorption of a gas component is then substantially equal to the average partial pressure driving force of the gas component in the absorber. At one atmosphere gas pressure, the partial pressure of a component is directly proportional to its ppmv gas concentration, and the average driving force may be stated in terms of the logarithmic mean ppmv average:

$$\Delta_l\ m = (\Delta 1 - \Delta 2)/\ln(\Delta 1/\Delta 2)$$

where $\Delta 1$ is the inlet gas concentration in ppmv, and $\Delta 2$ is the outlet gas concentration in ppmv, and ln is the natural logarithm A more realistic indication of the degree of relative $NO/NO_2$ absorption than is presented in Tables I and II may be obtained by correcting the degree of removal for the driving force to yield an approximation of an absorption rate coefficient. Based on an assumption of zero backpressure of both NO and $NO_2$ from the liquid solution, an approximate relative absorption rate coefficient may be stated in terms of the percent removal divided by the log mean driving force in (ppmv concentrations/1000). This parameter is called the transfer coefficient index (TCI). Table III shows the TCI values for $NO_2$ and NO calculated from the values shown in Table II. In all cases, the calculated NO absorption rate index is larger than that calculated for $NO_2$. For Runs 3 and 4, the calculated absorption rate coefficient for NO was about 12 times that for $NO_2$. These data are evidence of a highly unusual reversal of relative $NO/NO_2$ absorption behavior never before observed or achieved.

Analyses were also made of the concentrations of nitric and nitrous acid in the liquid in the reservoir tank 37 and the oxygenation vessel reservoir 20. These data are presented in Table IV. The second and third columns show the concentrations in tank 37 and reservoir 20 in parts per million by weight, ppmw. For Runs 1, 2 and 4, the concentrations of nitrous acid in the oxygenation reservoir 20 were lower than the concentration in the absorber tank 37. This indicates that the oxygenation vessel treatment in the practice of this invention serves to partially oxidize the nitrous acid in the absorber sump liquid. This oxidation is not complete, but the solubility of oxygen in either water or aqueous nitric solutions of the concentration range normally encountered in nitric acid plant absorbers is relatively small. However, despite this negative stoichiometry, NO dissolution in $HNO_3$ is greatly enhanced in the oxygen-treated liquid returned to the absorber 1 when the closed-end oxygenation process of this invention is employed.

TABLE III

| Run No. | % $NO_2$ Removal | ln mean delta $NO_2$ | Transfer Coefficient Index Percent Removal/Driving Force TCI $NO_2$ % $NO_2$ Rem./ mean delta | % NO Removal | ln mean delta NO | TCI NO % NO Rem./ delta NO |
|---|---|---|---|---|---|---|
| Run 1 AM | 46.7 | 1.054 | 44.3 | 57.6 | 0.607 | 95 |
| Run 1 PM | 32.1 | 1.437 | 22.3 | 37.3 | 0.879 | 42.4 |
| Run 2 | 36.8 | 0.733 | 39.6 | 30.1 | 0.706 | 42.6 |
| Run 3 | 53.5 | 1.780 | 19.9 | 74.5 | 0.310 | 240 |
| Run 4 | 58.9 | 1.180 | 31.0 | 55.4 | 0.154 | 360 |

TCI = Transfer Coefficient Index = (% removal/ln mean delta (ppmv/1000))

TABLE IV

| Run No. | Nitrous Acid ($HNO_2$) Analyses | | | |
|---|---|---|---|---|
| | $HNO_2$ Absorber Tank 37 PPM | $HNO_2$ Oxygenator Reservoir 20 PPM | $HNO_3$ Concn. % | Recycle Ratio |
| Run 1 | 522 | 348 | 11.7 | 5.6 |
| Run 2 | 4000 | 2000 | 31.8 | 3.0 |
| Run 3 | 4660 | 5769 | 3.4 | 6.0 |
| Run 4 | 200 | 100 | 18.2 | 6.0 |

See Table I for concentration of $HNO_3$ during Run 1.

See Table I for concentration of $HNO_3$ during Run 1.

Figure 2:
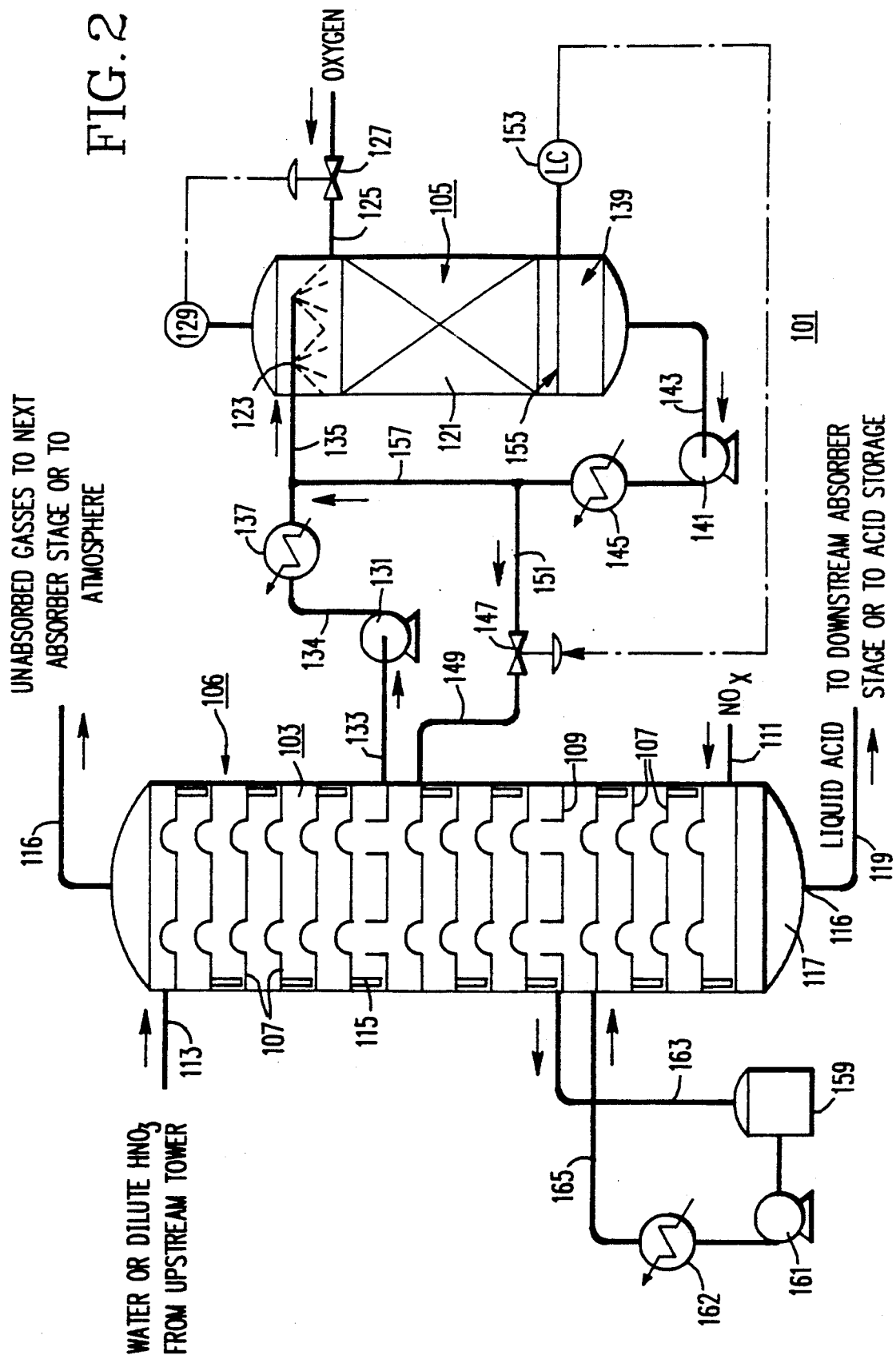
FIG. 2 is a diagrammatic view of one stage of a nitric acid generating plant in whose use the method of this invention is practiced.

FIG. 2 shows a stage 101 of a $HNO_3$-producing plant in whose use the invention is practiced. In any nitric acid-producing plant there are a plurality of such stages 101, typically two to six. The liquid and gases flow countercurrent to each other through successive absorbers in series, with water being introduced in the last absorber countercurrent to the weakest $NO_x$ gas concentration. The most concentrated gas is introduced in the first absorber, which produces the concentrated product acid. In the intermediate absorbers, if any, the acid produced in the downstream gas absorber is introduced in the top of the absorber, where it contacts the gas from the upstream gas absorber. The stage 101 comprises an absorber tower 103 and an oxygenator 105. Within the tower, there are a plurality of sets 106 of gas-liquid contactor trays 107. A liquid collector tray 109 is associated with each set 106 of gas-liquid contactor trays. The sets 106 of contactor trays may be supplemented by, or entirely replaced by packing (not shown). The absorber has an inlet 111 near the bottom for admitting gases containing $NO_x$, usually derived by oxidizing ammonia, and an inlet 113 near the top for water or aqueous $HNO_3$-$HNO_2$ solution generated by a downstream gas absorber. The liquid is typically injected on the top bubbler contact tray 107. The $NO_x$ and the liquid flow countercurrent through the tower 101, with liquid passing downward from contact tray to contact tray by means of downcomers 115. The $NO_x$ components of the gas are absorbed in the liquid on the contact tray to produce incremental nitrous and nitric acids as the gas bubbles up through the liquid on the contact trays. The absorber 103 has an outlet 116 for unabsorbed gases. The acid collects in reservoir 117 at the bottom of tower 103. An outlet 119 is provided for drawing $HNO_3$ from the reservoir 117. The oxygenator 105 has a gas-liquid contact packing 121. Above the packing 121 there are sprays 123. The oxygenator has an inlet 125 for oxygen which is connected to an oxygen cylinder or other high-pressure source (not shown) through a valve 127. A pressure transmitter 129 is in communication with the oxygenator interior. The transmitter 129 is connected to the valve 127 and closes the valve when the pressure within the oxygenator 105 reaches a predetermined magnitude.

A pump 131 drives liquid from a collector tray 109 collecting liquid from a series of contact trays 106 to sprays 123 through conductor 133, 134 and 135 and heat exchanger 137. The liquid is composed of $HNO_2$ and $HNO_3$.

The liquid delivered by the sprays 123 is contacted by the oxygen as described in connection with FIG. 1 and the product of the contacting collects in a reservoir 139 at the bottom of the oxygenator. The liquid from the reservoir 139 is returned to the absorber 103 by pump 141 through conductor 143, heat exchanger 145 valve 147 and conductors 149 and 151. The valve 147 is controlled by level control 153 which closes the valve when the level 155 of the liquid drops below a predetermined height. The oxygenator is typically maintained at equal or higher pressure than is the absorber. The liquid in reservoir 139 may be returned to the absorber by means of the differential pressure that typically exists between the oxygenator and absorber, or, alternatively, by means of the discharge pressure of the recycle pump 141. If a uniform acid concentration gradient is desired in the absorber, the oxygen-treated liquor from the oxygenator is returned to the appropriate contact tray below the collector tray from which is was initially derived. The liquid in reservoir 139 is also recycled through the oxygenator 105 by pump 141, through heat exchanger 145 conductor 157 and sprays 123.

The absorber 103 and the oxygenator 105 of stage 101 cooperate to improve the efficiency of the production of nitric acid over prior art practice and to reduce $NO_x$ emissions to the atmosphere.

Because of the highly exothermic absorption reactions in the conventional absorbers of a nitric acid plant, liquid withdrawn from a collector tray in conventional absorbers of a nitric acid plant is typically sent through a conductor 163 to a holding tank 159, and is then pumped by a pump 161 through a heat exchanger 162 and then through a conductor 165 to the contact tray below the collector tray. Separate oxygenation vessel/recycle pump/heat exchanger loops may be advantageously substituted for such conventional external liquid heat exchanger loops.

Because the rate of NO absorption determines the volume of the absorber train in a nitric acid plant, the results obtained show that the method of this invention allow more compact and economic new nitric acid plant design. Further, for existing plant, application of the method of this invention permit the achievement of higher production rates, higher produced acid concentrations and lower tail-gas $NO_x$ emissions. Further, the produced acid has lower $HNO_2$ content, and requires less bleach treatment.

While preferred practice of this invention has been disclosed herein, many modifications thereof are feasible. This invention is not to be restricted except insofar as is necessitated by the spirit of the prior art.

I claim:

1. The method of producing nitric acid while reducing the emissions of nitrogen oxides into the atmosphere with apparatus including an absorber and a closed vessel; the said method including: conducting nitrogen oxides through said absorber countercurrent to water or nitric acid to generate nitric acid and nitrous acid, supplying oxygen to said closed vessel under a positive pressure differential, supplying said nitric and nitrous acids to said closed vessel under a positive pressure differential to contact said nitrous and nitric acid from said absorber by said oxygen in said closed vessel, and recycling the product of the contacting of said nitrous and nitric acid with said oxygen as an absorbant to said absorber.

2. The method of claim 1 wherein the products of the contacting of said nitric and nitrous acids by said oxygen in said closed vessel are repeatedly recycled through said closed vessel.

3. The method of claim 1 wherein the pressure of the oxygen in the closed vessel is maintained at a magnitude substantially greater than atmospheric pressure.

4. The method of claim 1 wherein the oxygen supplied to the closed vessel is substantially pure.

5. The method of claim 1 wherein the recycled products of the contacting of nitric and nitrous acids by the oxygen are cooled during each cycle of the recycling.

6. The method of claim 1 wherein the nitric acid is dilute nitric acid having a concentration of about 31%.

7. The method of claim 6 wherein the nitric acid has a concentration of about 3.4%

8. The method of claim 1 including maintaining the pressure of the oxygen in the closed vessel substantially constant by supplying the oxygen continuously to the closed vessel so that the oxygen in the closed vessel is continuously replenished as it is used.

9. The method of reducing the emissions of nitrogen oxides, including nitric oxide and nitrogen dioxide, generated by an industrial process; said method including: absorbing said nitrogen oxides in water to produce nitrous and nitric acids, conducting said nitrous and nitric acids under positive pressure differential to a closed vessel, conducting oxygen to said closed vessel under positive pressure differential to contact said nitrous and nitric acids with oxygen in said closed vessel and recirculating the product of said contacting to absorb said nitrogen oxides.

10. The method of claim 9 including the step of recycling the product of the contacting of the nitrous and nitric acids by the oxygen through the closed vessel.

11. The method of claim 9 including maintaining the pressure in the closed vessel substantially higher than atmospheric pressure.

12. The method of claim 9 wherein the oxygen supplied to the closed vessel is substantially pure oxygen.

13. The method of producing nitric acid with apparatus including an absorber including a first column and a sump, and also including separately an oxygenator having a closed vessel including a second column and a reservoir, said vessel being sealed gas tight but having openings for receiving and transmitting liquids and for receiving a gas; the said method including: supplying nitrogen oxides to said first column, interacting said nitrogen oxides with liquid in said first column to produce a resulting liquid, collecting said resulting liquid in said sump, supplying oxygen under positive pressure differential to said vessel, supplying the resulting liquid collected in said sump to said second column under positive pressure differential to interact the liquid with the oxygen in said second column, collecting the so interacted liquid in said reservoir, and supplying the so interacted liquid collected in said reservoir to said first column as at least part of the liquid reacted in said first column with the nitrogen oxides supplied to said first column to produce said nitric acid.

14. The method of claim 13 wherein the oxygen is supplied to the vessel at an elevated pressure.

* * * * *